United States Patent [19] [11] 4,173,315
Clausser [45] Nov. 6, 1979

[54] UNIVERSAL 35MM FILM CARTRIDGE FOR REWIND AND NO-REWIND OPERATION

[76] Inventor: Karl C. Clausser, 695 La Cadena Dr., Riverside, Calif. 92501

[21] Appl. No.: 909,515

[22] Filed: May 25, 1978

[51] Int. Cl.$^2$ .............................................. B65M 75/28
[52] U.S. Cl. ..................................... 242/74; 242/71.2
[58] Field of Search ....................... 242/71.2, 74, 71.1, 242/71

[56] References Cited

U.S. PATENT DOCUMENTS

| | | | |
|---|---|---|---|
| 2,900,868 | 8/1959 | Gaffney | 242/74 X |
| 3,756,528 | 9/1973 | Ohmura | 242/71.2 X |

Primary Examiner—Edward J. McCarthy
Attorney, Agent, or Firm—Herbert E. Kidder

[57] ABSTRACT

A 35mm film cartridge in which the link between the core of the cartridge and the film to be contained in the cartridge is an elongated trailer made of one-sided adhesive tape doubled up around the core of the cartridge and adhesive sides together, to the free ends of which trailer is attached between its adhesive sides the end of the film for a short length of approximately 15mm, and which trailer is cross-perforated to form a break-off tip containing the attached film, and which trailer further has its adhesive sides separated by backing or non-stick liner for another similar short length adjoining the cross-perforation. The width of the trailer is slightly less than the width of the film so as to cover the double perforation of the film, and the material of the trailer can be paper or another suitable material, and the trailer extends to a length of approximately 75mm when fully pulled out. Intended to eliminate the cumbersome rewind operation of present 35mm cameras, the cartridge will serve both functions of feeding and taking up successively in cameras designed for no-rewind operation utilizing two cartridges facing each other for identical but not the same film. The cartridge also can be used in existing cameras without alteration, and is therefore universally useable.

2 Claims, 4 Drawing Figures

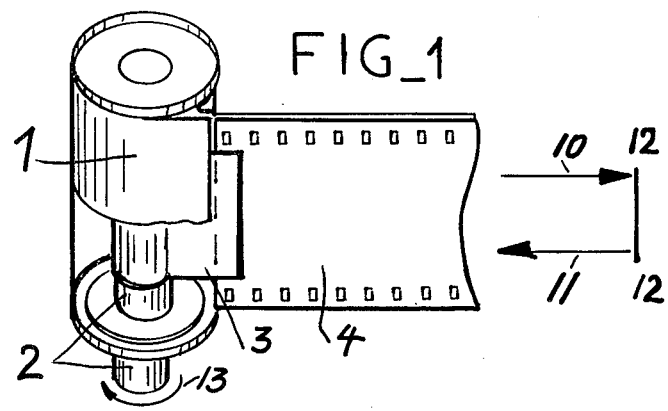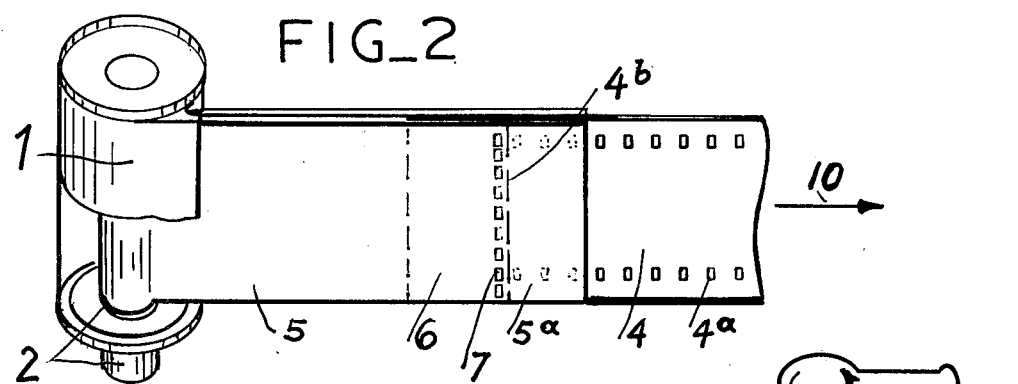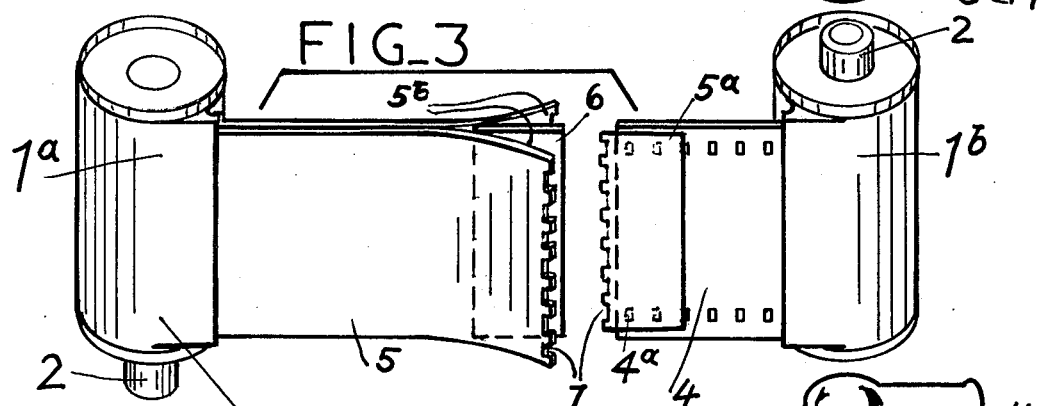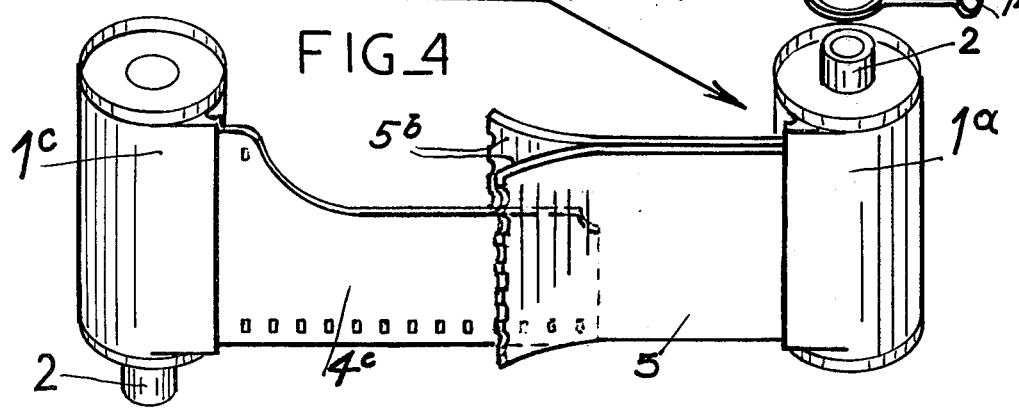

UNIVERSAL 35MM FILM CARTRIDGE FOR REWIND AND NO-REWIND OPERATION

BACKGROUND OF TH INVENTION

The present invention relates to 35 mm camera film cartridges, and more particularly to a 35 mm film cartridge designed to eliminate the hitherto necessary rewinding of the film after exposure, especially in cameras designed to take full advantage of the possibilities of the new cartridge.

Since their inception, 35 mm cameras suffered from the burden of the necessity to rewind the film into its originating cartridge after exposure, which required, besides the needed advance mechanism, provisions for isolating the advance mechanism and arrangements to rewind the film back into the cartridge it was pulled out of for exposure. This sometimes resulted in quite elaborate mechanisms, which are failure prone, besides the time consuming and inconvenience of the rewind operation itself.

Numerous attempts have been made to overcome the problem, and solutions have been offered requiring special cartridges of a physical size differing from the common cartridge, or elaborate cassettes and similar self-contained arrangements, which however have been found unsatisfactory, for a number of reasons, not the least of them has been the difficulty to maintain critical focusing distance in the filmplane.

It is the object of the present invention, to offer on the basis of the common 35 mm cartridge a solution to eliminate the problems associated with the rewind mode of operation of cartridges and cameras of prior art, like time consuming rewind, scratching of film and sometimes static discharges created through friction between the film layers by too rapid movement.

SUMMARY OF THE INVENTION

The primary object of the invention is to make possible a mode of operation of 35 mm photography that does not require the operation of rewinding the exposed film back into its originating cartridge, but to move the film only one time, i.e. from one cartridge into a second cartridge, frame by frame after exposure of each frame, before being processed. Yet every cartridge is used twice, performing the function of first dispensing the film, and secondly taking up the exposed film, in succession.

This mode of operation allows for greatly simplified camera design, efficient, safe, simple and economical handling of cartridge and camera while avoiding the drawbacks and problems associated with the picture taking process of prior art, especially as related to the necessity of rewinding the film.

These objects are achieved in the present invention by providing an improved cartridge of the identical physical outside dimensions as the commonly used cartridge, in which improved cartridge the film to be contained is connected to the core of the cartridge by an elongated trailer of one-sided adhesive tape with provision for twice connecting a film to its free end, the trailer being doubled up in its middle and attached around the core of the cartridge. The provisions for connecting the film to the trailer are provided in the following described way: the adhesive sides of the trailer are brought together after wrapping around the core, but for about a length of 30 mm from the free ends is inserted a liner of non-stick characteristic between the adhesive sides for separation, or a backing may be left there in preparation of the trailer, as the case may be, and this length of separation is divided in two 15 mm sections by a cross-perforation, where by a break-off part is formed, to which the end of the film to be contained in the cartridge is attached after removal of the backing up to the perforation. After the film is exposed and the end has been pulled out of the cartridge until the attached trailer is stretched, a break-off at the cross-perforation will be effected automatically or manually, and the residual 15 mm of trailer-separation is than used to attach the leader of a new film between the adhesive sides after removal of the backing, and after changing position in the camera, the cartridge will now perform the function of taking up the new film, which when fully exposed, will pull out the trailer of the new cartridge, break-off the end of the film, and the cycle can be repeated as often as desired or needed.

It is an obvious technical and economical advantage of this mode of operation, that the film is moved only once, from one cartridge into the other, possibilities of damage to the film are minimized and handling and changing film is greatly improved.

Another advantage of the invention is that it allows for much simpler and economical camera design, as the costly rewind-mechanism is eliminated and the advance mechanism simplified, the cameras simply provided with two wells or compartments for two cartridges facing each other across the format-filmplane, and a simple advance mechanism. Each cartridge performs the functions of dispensing the film and taking up in succession, in different positions. It is also possible to arrange the advance mechanism in a way, that each cartridge performs both functions successively without changing positions, making handling and operating still easier and faster.

A further advantage of the present invention is that the cartridge can be used without change in existing cameras operating in the rewind mode. The covering of the film perforation by the break-off tip will stop the advance on the commonly used metering device without danger of breaking off, and the film can then be rewound in the manner characteristic for the particular camera used, thereby rendering the new cartridge truly universal useable.

BRIEF DESCRIPTION OF THE DRAWINGS

FIG. 1 is a partial sectional view of a conventional 35 mm film cartridge.

FIG. 2 is a partial sectional view of the of the embodiment of the universal 35 mm film cartridge.

FIG. 3 is a perspective view of the first step of the no-rewind mode of operation, showing two cartridges in use.

FIG. 4 is a perspective view of the second step of the no-rewind mode of operation, showing two cartridges of the preferred embodiment of the invention in use.

DESCRIPTION OF THE PREFERRED EMBODIMENT

For comparative reasons is shown in FIG. 1 a conventional 35 mm cartridge in partial section, in which film 4 is attached to core 2 of cartridge 1 by a short retainer 3 in such a way, that film 4 does not leave the cartridge 1 after full exposure, which forward movement is indicated by arrow 10, line 12 indicating stop of movement, and arrow 11 is indicative of the returnmovement of film 4 into the cartridge 1, the rewind mechanism involved being symbolized by circling arrow 13.

In FIG. 2 is shown the preferred embodiment of the invention, cartridge 1 containing core 2, to which is attached in its middle a trailer 5 of adhesive tape doubled up around the core 2 and its adhesive sides together, except for the length of about 30 mm from the ends, which are separated by backing left in preparation or by inserting of a non-stick liner 6, and a break-off tip 5a formed by a cross-perforation 7 approximately 15 mm from the end of trailer 5, to which break-off tip is attached the end of film 4, after removal of backing 6 to the perforation; trailer 5 extending for a length of approximately 75 mm out of cartridge 1, and having a width of approximately 34 mm, slightly less than the width of film 4, Break-off tip 5a will thus cover the perforation 4a of film 4 for a lentgh of approximately 15 mm. Before use, film 4 to be contained in cartridge 1 is rolled into the cartridge 1, until only its leader, similar to leader 4c in FIG. 4, is extending out of cartridge 1, which fact is self-evident and needs no showing.

In FIG. 3 is shown the first step of no-rewind operation, in which film 4 is taken up into cartridge 1b by employing advance mechanism symbolized by 14, and break-off tip 5a separated at perforation 7 from trailer 5 after trailer 5 was pulled out of cartridge 1a and stretched to break the perforation 7. Liner 6 is shown separating the adhesive sides 5b of trailer 5. Breaking of perforation 7 can also be effected by hand, since the camera can safely be opened at this point of operation, film 4 being light safe contained in cartridge 1b.

FIG. 4 shows the second step of no-rewind operation, cartridge 1a shown in the position of cartridge 1b of and in FIG. 3, while a new film contained in cartridge 1c has its leader 4c attached between the adhesive sides 5b of trailer 5 extending out of cartridge 1a, after removal of liner 6 as shown in FIG. 3. The cycle of operation now begins again, film 4c being taken up into cartridge 1a by means of advance mechanism 14.

While the above is the preferred embodiment of the invention, I wish it understood, that variations in design and materials are possible within the scope of the invention, and those skilled in the art will understand that the invention is not necessarily limited to the form shown in the drawings, and changes may be made within the scope of the appended claims.

What I claim is:

1. A universal 35 mm film cartridge for rewind or no-rewind operation, comprising:
   a hollow cylindrical cartridge having a rotatable core at the center thereof;
   an elongated trailer of one-sided adhesive tape wrapped at its midpoint around said core with the adhesive side facing toward and adhered to the core, the two ends of said tape having their adhesive sides face-to-face and adhered together for a substantial portion of their length, and extending from said core in a generally radial or tangential direction;
   unexposed film having a specified length of its end sandwiched between the extremities of said adhesive tape ends and firmly adhered thereto;
   an insert of non-stick sheet material disposed between said tapes and extending from the tip end of said film toward said core for a distance substantially equal to said specified length;
   said tape ends having a line of cross-perforations at the juncture between said film end and said non-stick material, whereby the film end and attached portions of adhesive tape can be broken off so as to separate the film from said trailer, the edge of non-stick material being then exposed, whereby the two tape ends can be pulled apart from the non-stick material to expose the adhesive surfaces so that the leader strip of another roll of film can be inserted between them and adhered to the adhesive surfaces.

2. A film cartridge as in claim 1, wherein said trailer extends for approximately 75 mm from said core; said specified length of unexposed film sandwiched between the ends of the trailer is approximately 15 mm; and said insert of non-stick material extends for approximately 15 mm from the end of the film toward said core.

* * * * *